(12) United States Patent
Swaney et al.

(10) Patent No.: US 6,952,763 B1
(45) Date of Patent: Oct. 4, 2005

(54) WRITE BEFORE READ INTERLOCK FOR RECOVERY UNIT OPERANDS

(75) Inventors: Scott B. Swaney, Catskill, NY (US); Mark S. Farrell, Pleasant Valley, NY (US); Robert F. Hatch, Ulster Park, NY (US); David P. Hillerud, Poughkeepsie, NY (US); Charles F. Webb, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 09/677,363

(22) Filed: Oct. 2, 2000

(51) Int. Cl.[7] .............................. G06F 9/30; G06F 9/40
(52) U.S. Cl. ..................................... 712/216; 712/217
(58) Field of Search ................................ 712/216, 217

(56) References Cited

U.S. PATENT DOCUMENTS

| 4,903,196 | A | * | 2/1990 | Pomerene et al. | .......... | 712/217 |
| 5,251,306 | A | * | 10/1993 | Tran | ........................... | 712/217 |
| 5,471,591 | A | * | 11/1995 | Edmondson et al. | ....... | 712/217 |
| 5,692,121 | A | | 11/1997 | Bozso et al. | | |
| 5,790,827 | A | * | 8/1998 | Leung | ........................ | 712/216 |
| 6,438,681 | B1 | * | 8/2002 | Arnold et al. | .............. | 712/216 |

OTHER PUBLICATIONS

Computer Organization and Design—The Hardware/Software Interface, 2nd Edition, John L. Hennessy and David A. Patterson, Morgan Kaufmann Publishers, 1998; pp. 445 and 541.*
InstantWeb Online Computing Dictionary; "Microcode"; http://www.instantweb.com/d/dictionary/foldoc. cgi?query=microcode; Nov. 26, 1996.*

* cited by examiner

Primary Examiner—Daniel H. Pan
(74) Attorney, Agent, or Firm—Lynn L. Augspurger; Cantor Colburn LLP

(57) ABSTRACT

An exemplary embodiment of the invention is a method for holding up recovery unit (R-unit) operands for a minimum number of cycles, until all prior updates have completed, by comparing addresses in at least one queue and interlocking valid R-unit register address matches. The method includes receiving a plurality of R-unit register addresses and storing these R-unit register addresses in at least one queue. This method includes a write queue, a read queue, and a pre-write queue. Further, this method requires accessing these queues and comparing the R-unit register addresses therein. After the addresses are compared, the method determines whether there is a valid match between the R-unit register addresses and if so, implementing one of more interlocks.

18 Claims, 1 Drawing Sheet

WRITE BEFORE READ INTERLOCK FOR RECOVERY UNIT OPERANDS

BACKGROUND OF THE INVENTION

The present invention relates generally to detecting the updating of recovery unit (R-unit) registers and in particular to a write-before-read interlock that returns data as soon as it is available. A detailed description of a recovery unit for mirrored processors is found in U.S. Pat. No. 5,692,121 to Bozso et al., issued Nov. 25, 1997, and incorporated by reference.

Currently, high performance processors are typically pipelined. Pipelining is a method of processing that allows for fast concurrent processing of data. This is accomplished by overlapping operations in a portion of memory that passes information from one process to another process. Most processor instructions have to go through the same basic sequence: the instruction must be fetched, it must be decoded, it must have its operands fetched, (which may first require-address generation), it must be executed, and its results must be put away. The pipelining method fetches and decodes instructions in which, at any given time, several program instructions are in various stages of being fetched or decoded. The pipelining method improves the speed of system execution time by ensuring that the microprocessor does not have to wait for instructions. When the processor completes execution of one instruction, the next instruction is ready to be performed.

Computer systems contain several types of registers including General Purpose registers (GPRs), Access registers (ARs), Floating Point registers (FPRs), Host and Guest Control registers (CRs). The millicode architecture contains additional registers —Millicode General Purpose registers (MGRs), Millicode Access registers (MARs), Millicode Control registers (MCRs), and System registers (SYSRs). These millicode registers may only be directly accessed by millicode instructions. There are multiple copies of some of these registers throughout the processor, for performance and cycle-time reasons. When an instruction is executed which updates one of these registers, the new value is placed on a common bus "C-bus" during the put-away stage of the pipeline, and all copies of the registers are updated from the common bus. In order to be able to recover from errors, one copy of every register is contained in the R-unit, and protected by an Error Correction Code (ECC). All the registers in the R-unit are assigned an 8-bit address. In order to recover from errors, all of these registers, and storage, must be "check-pointed". This means that at any given time, there must be one copy of the registers and storage that reflect the results at the completion of an instruction. In other words, if an instruction updates multiple registers, or a register and storage, either all of the updates must be visible, or none of them. When an error is encountered, all copies of the registers are restored to their check-pointed state, and return control back to the point following the last instruction to complete. The R-unit copy of the registers is the check-pointed copy. Ensuring that the register updates are synchronous with any storage updates requires additional machine cycles from when the results are "put-away" until they are check-pointed. GPRs, ARs, FPRs, MGRs, and MARs are used frequently, so they must be accessible without incurring any stalls in the pipeline, or performance would suffer. Thus, the execution unit contains copies of these registers so that they may be accessed locally without incurring a pipeline stall. CRs and MCRs are not used frequently, so performance is not significantly impacted if a pipeline stall is encountered while accessing them. Thus, the only copy of these registers is the ECC protected copy in the R-unit. Because of the additional cycles after the put-away cycle required to maintain the R-unit checkpoint, access to registers from the R-unit may incur pipeline stalls.

Typically, these R-unit operands are not used or updated until late in the pipeline. This results in the loss of processor time due to unnecessary clock cycles. In addition, instructions in the pipeline may update an R-unit register that is a source operand used in a later instruction (pre-fetching) for its operands. Again, this condition is not efficient and results in added clock cycles. Consequently, there is a need for a quicker and more efficient method of detecting when R-unit registers are being updated during the pre-fetching of operands period to guarantee that the correct values are sent for access to register operands in the R-unit with a minimum number of clock cycles required.

BRIEF SUMMARY OF THE INVENTION

An exemplary embodiment of the invention is a method for holding up R-unit operands by comparing R-unit register addresses in at least one queue and interlocking valid address matches. The method includes receiving a plurality of R-unit register addresses and storing these R-unit register addresses in at least one queue. This method includes a write queue, a read queue, and a pre-write queue. Further, this method requires accessing these queues and comparing the R-unit register addresses therein. After the addresses are compared the method determines whether there is a valid match between the R-unit register addresses and if so, implementing one or more interlocks.

BRIEF DESCRIPTION OF THE DRAWINGS

Referring now to the drawings, wherein like elements are numbered alike in the FIGURE.

DETAILED DESCRIPTION OF THE INVENTION

Figure 1:
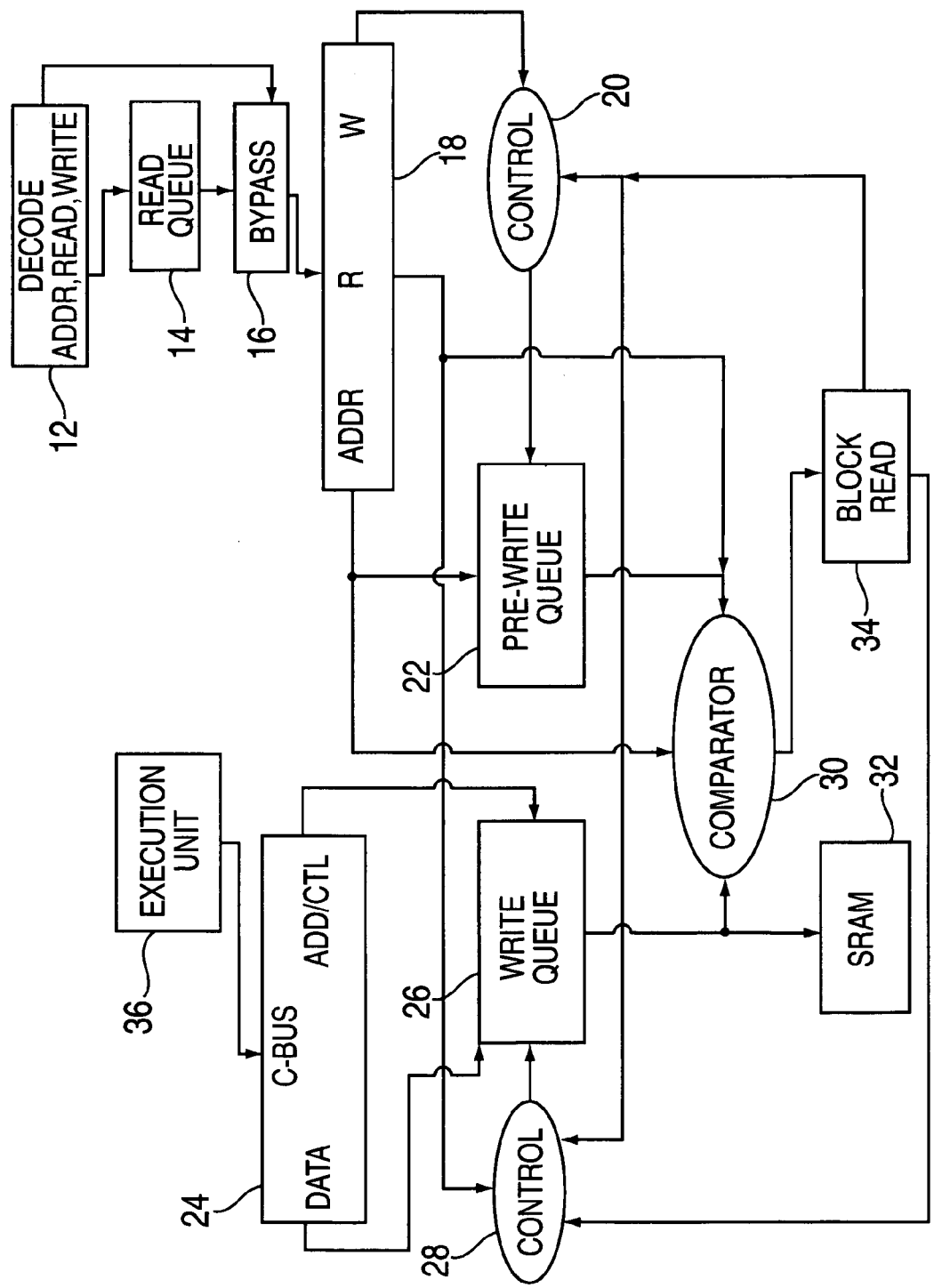
FIG. 1 is a system diagram for implementing the write-before-read interlock feature in one preferred embodiment of the invention.

As discussed herein, current computer systems have micro-processor pipelines which include R-unit register operands that are accessed early in the pipeline, but are not used or updated until late in the pipeline. An instruction in the pipeline may update an R-unit register that is a source operand for a later instruction that is pre-"fetching" it's operands.

The present invention solves the problem of accessing R-unit register operands which have updates pending from instructions further along in the pipeline. Specifically, this problem is solved by introducing a write-before-read interlock that detects this condition and waits until all updates to the register have been made before returning its value, incurring a minimum number of penalty cycles.

In addition, the R-unit uses three queue structures that compare addresses to implement the write-before-read interlock (i.e. read queue, write queue, pre-write queue). With the interlock, data is returned for the operand as soon as it is available. Without the interlock, an interface would have to be added between the R-unit and decode device to hold up (or reject) decode operations until there are no more pending updates to the source register, which could result in additional penalty cycles and negatively impact performance. Therefore, the present invention saves valuable processing time.

FIG. 1 is an exemplary system diagram for the preferred embodiment of the invention for returning R-unit register operand data as soon as it becomes available. Copies of all architected and semi-architected registers are maintained in the R-unit, protected by ECC for recovery purposes. The entire register space is mapped to an 8-bit R-unit address. Most of the registers in the R-unit (addresses '00'x–'9F'x) may only be updated via a common data bus (C-bus) 24 from an execution unit 36. Since these registers only have one update source, they are implemented in a single port SRAM 32. The remaining registers in the R-unit are updated by separate hardware interfaces as well as the C-bus 24, and are implemented as discrete registers.

For instructions that update multiple registers, the partial results must be accumulated until the instruction completes, then all partial results are check-pointed on the same cycle. For the addresses that are implemented as discrete registers, there is a fixed timing from the time the execution unit 36 "endops" the instruction until the register values are check-pointed in the R-unit and available to be read. However, for the addresses that are implemented in the single-port SRAM 32, partial results are accumulated and check-pointed in the write queue 26 with the same fixed timing. However, the accumulated partial results are not available to be read from the R-unit until they drain from the write queue into the single-port SRAM 32 over an undetermined number of cycles. Consequently, the number of cycles depends on how many partial results were required for the instruction, as well as, whether or not subsequent instructions required access to the SRAM 32 for source operands. (Priority is given to read the single-port SRAM 32, unless the address being read has a pending update.)

For instructions which require R-unit source operands, or explicitly update R-unit registers, decode device 12 sends a request to the R-unit containing the R-unit address, and predetermined bits to indicate whether the corresponding address is to be read, written, or both. These requests are put into the read queue 14 (or bypass device 16 if the read queue 14 is empty). Since the micro-processor decodes and executes instructions in-order, the read queue 14 is implemented FIFO, so that the requests are processed serially in the order in which they were received from the decode device 12.

When a valid read address is presented, either from the read queue 14 or bypassed from the decode device 12, the address is compared, with the comparator 30, against all valid entries in the write queue 26. If the read address matches any valid address in the write queue 26, then the read cannot be processed and a "block read" condition is set to indicate such. During the block read the control 28 switches the priority for the single SRAM 32 port from processing read addresses from the read queue to draining the accumulated results from the write queue 26 until the address compare is no longer active. This piece of the interlock guarantees that any register updates already sent by the execution unit 36 will be properly reflected in the data returned for the read address. Note that while reads are being blocked, the decode device 12 may still send more requests to the read queue 14. If the read queue 14 approaches full, it must block the decode device 12. This has a negligible performance impact, as it means the decode device 12 is far ahead of execution.

The second part of the interlock covers the cases where an instruction which updates an R-unit register has not reached the put-away stage of the pipeline yet. These instructions update an R-unit register that contains a source operand used for a later instruction that has already decoded. This interlock compares the read address (r) 18 against the entries in the pre-write queue 22, that contain register addresses which are going to be written.

For instructions that explicitly update R-unit registers, the decode device 12 turns on a "write" (w) bit in the request to the R-unit. When this request is processed from the read queue 14, the write bit tells the control 20 to put this request into the pre-write queue 22. If the read bit is also on, then the request will not move to the pre-write queue 22 until the actual read is processed (no block read condition). If only the write bit is on, then the request moves directly to the pre-write queue 22. When a register is updated via the C-bus 24, the address is compared against the address of the oldest entry in the pre-write queue 22. If the address matches, then the entry is removed from the pre-write queue 22. Although unlikely, it is theoretically possible to fill the pre-write queue 22. If the pre-write queue 22 fills, it blocks any additional requests from being processed from the read queue 14. Again, this has a negligible performance impact.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for performing write-before-read interlocks for recovery unit operands, comprising:
   receiving a plurality of recovery unit register addresses associated with a millicode architecture environment, said recovery unit register addresses including at least one of a millicode general register and a millicode access register;
   storing said recovery unit register addresses in a plurality of queues including a write queue, a pre-write queue, and a read queue;
   accessing said queues;
   comparing said recovery unit register addresses;
   determining matches between said recovery unit register addresses; and
   implementing one or more write-before-read interlocks after said determining produces a valid match, said one or more write-before-read interlocks being implemented until said comparing is no longer active;
   wherein operands of recovery unit registers are updated during an operand prefetching period.

2. The method of claim 1 wherein one of said write-before-read interlocks causes a millicode read instruction not to execute.

3. The method of claim 1 wherein said comparing includes comparing said recovery unit register addresses sent to said read queue against said recovery unit register addresses sent to said write queue.

4. The method in claim 1 wherein said determining includes matching valid recovery unit register addresses of said write queue and said read queue.

5. The method in claim 4 wherein said determining also includes matching said valid recovery unit register addresses of said pre-write queue and said read queue.

6. The method in claim 1 wherein said one or more write-before-read interlocks prevent millicode read instructions from being processed.

7. The method in claim 1 wherein a write queue accumulates said recovery unit register addresses.

8. The method in claim 1 wherein said updating occurs when an SRAM receives the accumulated results from a write queue.

9. The method of claim 8, wherein the SRAM has at least one port, the priority of the port being changed from reading to writing, when one of the write-before-read interlocks is active.

10. A system for performing write-before-read interlocks for recovery unit operands, comprising:
   a plurality of queues for storing recovery unit register addresses associated with a millicode architecture environment, said recovery unit register addresses including at least one of a millicode general register and a millicode access register, the queues including a write queue, a pre-write queue, and a read queue;
   a comparator for comparing said recovery unit register addresses in said plurality of queues and determining matches between said recovery unit register addresses; and
   a plurality of write-before-read interlocks that are implemented after valid matches of said recovery unit register addresses are determined, said write-before-read interlocks being implemented until said comparing is no longer active;
   wherein operands of recovery unit registers are updated during an operand prefetching period.

11. The system of claim 10 wherein one of said write-before-read interlocks causes a millicode read instruction not to execute.

12. The system in claim 11 wherein said interlocks prevent millicode read instructions from being processed.

13. The system of claim 10 wherein said comparator compares said recovery unit register addresses sent to said read queue against said recovery unit register addresses sent to said write queue.

14. The system in claim 10 wherein said comparator determines said valid recovery unit register address matches between said write queue and said read queue.

15. The system in claim 10 wherein said comparator determines said valid recovery unit register address matches between said pre-write queue and said read queue.

16. The system in claim 10 wherein said recovery unit addresses are accumulated in said write queue.

17. The system in claim 10 wherein said recovery unit registers are updated when an SRAM receives the accumulated results from said write queue.

18. The method of claim 17, wherein the SRAM has at least one port, the priority of the port being changed from reading to writing, when one of the write-before-read interlocks is active.

* * * * *